C. HICKS.

Varnishing Percussion Caps.

No. 1,257. Reissued Jan. 14, 1862.

N. PETERS, PHOTO-LITHOGRAPHER, WASHINGTON, D. C.

UNITED STATES PATENT OFFICE.

AMERICAN FLASK AND CAP COMPANY, OF WATERBURY, CONNECTICUT, ASSIGNEES OF CHARLES HICKS.

IMPROVEMENT IN MACHINES FOR VARNISHING PERCUSSION-CAPS.

Specification forming part of Letters Patent No. 16,646, dated February 17, 1857; Reissue No. 1,257, dated January 14, 1862.

*To all whom it may concern:*

Be it known that CHARLES HICKS, of Haverstraw, in the county of Rockland and State of New York, did invent a new and useful Machine for Varnishing Percussion-Caps; and we do hereby declare that the following is a full, clear, and exact description of the same, reference being had to the accompanying drawings, making a part of this specification, in which—

Figure 1:
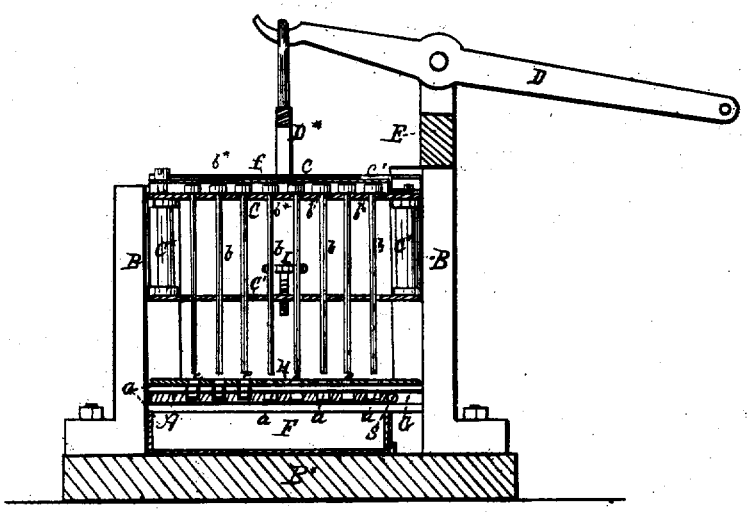
Figure 2:
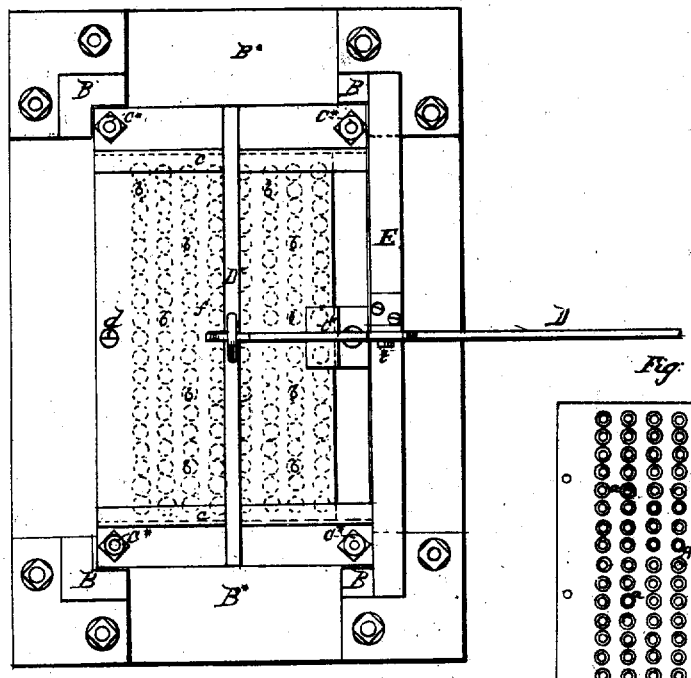
Figure 3:
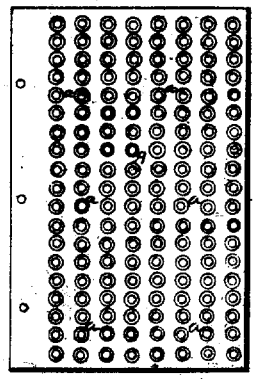
Figure 4:
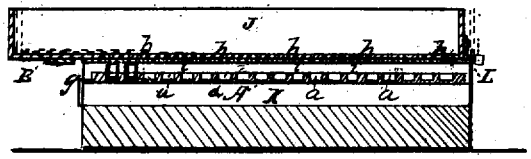

Figure 1 is a vertical section of the machine. Fig. 2 is a plan of the same. Fig. 3 is a plan of the plate in which the caps are held during the varnishing.

Similar letters of reference indicate corresponding parts in the several figures.

The process to be performed by this machine, termed "varnishing," consists in depositing within the caps a small quantity of what is termed "varnish," to secure the powder with which they are either previously or subsequently charged, and (when applied after charging) to protect the powder from moisture. This process is generally performed on the caps one at a time in the machine in which the caps are made; but by this machine several hundred caps may be varnished at a time, ready for or subsequently to being charged with powder by suitable apparatus.

To enable others to make and use the invention, we will proceed to describe its construction and operation.

A is a stout plate of brass or other material, which is employed to hold the caps during the varnishing operation, and also during the operations of charging and ramming. This plate, of which a separate view is given in Fig. 3, and which is also shown in section in its place in the machine in Fig. 1, contains a large number of holes, *a a*, each of which is intended to receive a cap. These holes, which are arranged in parallel rows equidistant from each other, are first drilled of smaller diameter than the caps right through the plate, and then severally countersunk uniformly, with a bore sufficient to receive the caps, to such a depth that when the caps are in them their mouths will stand a little above the surface of the plate, as shown in Fig. 1, where some caps are shown in section in red color. The caps are placed in the holes *a a* by simply throwing a sufficient number of them upon the plate, and shaking the plate about till a cap enters every hole. The weight of the heads of the caps causes them to find their way into the holes mouths upward, ready to receive the varnish.

B B B B are four upright posts erected firmly upon a bed-piece, B*, and containing upright rabbets to receive the corners of two horizontal plates, C C′, of quadrangular form, which are connected near their corners by small upright standards C*, so as to constitute a vertically-moving frame. This frame C C′ C* is suspended by a yoke-piece, D*, which is attached to the top plate, C, from the front end of a lever, D, which works upon a fulcrum, *t*, that is carried by a bridge-piece, E, that is supported by two of the posts B B. The lever D may be connected at its back end with a treadle below the table or stand on which the base-piece B* is to be placed. The plates C C′ of the vertically-moving frame are provided each with small holes corresponding in number and arrangement with the number and arrangement of the holes *a a* in the plate A, said holes serving to receive a number of upright wires or rods, *b b*, which are employed to take up on their lower ends a small quantity of varnish from a stationary trough, F, which is placed on the bed B* below the frame C C′ C*. The wires *b b* are much smaller than the interiors of the caps. They are provided at their upper ends with heads *b** *b**, to prevent them dropping through the plates C C′, and these heads are all covered with a loose plate, *f*, which rests on the top of them, the said plate being confined, so as to prevent it moving endwise, by two lip-pieces, *c c*, attached to the top of the plate C, and to prevent it moving backward or forward by a lip-piece, *c′*, and a pin, *d*, and being allowed only a slight motion upward by the said lip-pieces. The weight of this plate serves to keep the wires from rising out of their places in the frame C C′ C*.

Just above the varnish-trough F two horizontal grooved guide-pieces, G, (one of which is shown in Fig. 1,) are attached to the posts B B, to receive the ends of the plates A, which slide thereinto to a proper position under the wires *b b*, and each guide-piece is provided with a stop, *s*, to arrest the plate A in the proper position when it is slid under the wires.

A little above the guides G there is a stationary plate, H, containing a number of holes, *e e*, (see Fig. 1,) that are similarly arranged to the holes in the plates C C′, but smaller than the interior of the caps. The plate H is to prevent any of the caps being lifted out of the holes *a a* in the plate A by their adhesion to the varnish in the wires *b b*.

Near each end of the plate C′ an upright screw, I, screws through the said plate for the purpose of regulating the depth to which the wires *b b* are allowed to dip into the varnish in the trough F, said screws stopping the further descent of the frame C C′ C* when their lower ends come into contact with the plate H, and thus prevent the further descent of the wire.

The operation of the machine is as follows: Before the plate A, containing the caps, is placed in the machine, the operator, controlling the frame C C′ C* by means of the lever D, allows the said frame to descend by its own weight until the screws I rest on the plate H, and by that means the wires *b b* are dipped into the varnish in the trough F just deep enough to take up the requisite quantity of varnish. He then, by means of the lever D, raises the frame high enough to allow the plate A, containing the caps, to be slid into the grooves G, and after sliding in the said plate he allows the frame C C′ C* to descend till the wires *b b* all touch the bottoms of the caps, by which means a suitable quantity of varnish from one of the wires *b b* is deposited in every cap. He then again raises the frame C C′ C* high enough to bring the lower ends of the wires into or through the holes *e e* in the plate H, by which means any caps adhering to the wires are pulled off and caused to drop back into the plate A, and the plate A is left at liberty to be drawn out from the machine and taken to the charging apparatus, if the caps be not previously charged.

By employing several plates, A A, in connection with one varnishing-machine and having them ready fitted, one plate full of caps can be put into the machine as soon as another is taken out. When the quantity of varnish diminishes in the trough to such an extent that the quantity of varnish taken up by the wires *b b* is insufficient, the screws I I are screwed up a little to allow the wires to descend deeper into the trough.

This invention is equally applicable to the varnishing of the caps employed in making metallic or other cartridges.

The vertical movement may, if preferred, be applied to the trough F, instead of or as well as to the frame C C′ C*.

What we claim as the invention of the aforesaid CHARLES HICKS, and desire to secure by Letters Patent, is—

1. A series of rods, *b*, or their equivalents, connected by any suitable means, and a plate, A, perforated at distances to correspond with the rods employed, in combination to apply varnish or other material to a number of caps simultaneously.

2. The combination of a frame, C C′ C*, carrying a number of wires or rods, *b b*, or their equivalents, to take up the varnish, a trough, F, to contain the varnish, and suitable guides above the said trough to receive a plate which carries the caps, the whole being constructed and operating together substantially as herein described.

3. The plate H, containing holes corresponding in number and arrangement with the wires or rods *b b*, or their equivalents, arranged relatively to the trough F, the vertically-moving frame C C′ C*, and the guides G, substantially as herein described, for the purpose set forth.

AMERICAN FLASK AND CAP CO.,
Per ABRAM IVES,
*President.*

Witnesses:
O. D. MUNN,
J. W. COOMBS.